US009843246B2

(12) United States Patent
Griem et al.

(10) Patent No.: US 9,843,246 B2
(45) Date of Patent: Dec. 12, 2017

(54) METHOD AND APPARATUS FOR FORMING CORONA SHIELDING

(71) Applicant: Siemens Aktiengesellschaft, Munich (DE)

(72) Inventors: Harald Griem, Spardorf (DE); Steffen Lang, Hallerndorf (DE); Friedhelm Pohlmann, Essen (DE); Christian Staubach, Marl (DE)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 14/760,476

(22) PCT Filed: Dec. 30, 2013

(86) PCT No.: PCT/EP2013/078111
§ 371 (c)(1),
(2) Date: Jul. 12, 2015

(87) PCT Pub. No.: WO2014/111235
PCT Pub. Date: Jul. 24, 2014

(65) Prior Publication Data
US 2015/0357890 A1 Dec. 10, 2015

(30) Foreign Application Priority Data

Jan. 15, 2013 (DE) .......... 10 2013 200 499

(51) Int. Cl.
*H02K 15/10* (2006.01)
*B05D 1/02* (2006.01)
(Continued)

(52) U.S. Cl.
CPC ............. *H02K 15/105* (2013.01); *B05D 1/02* (2013.01); *H02K 3/40* (2013.01); *H02K 15/12* (2013.01)

(58) Field of Classification Search
None
See application file for complete search history.

(56) References Cited

U.S. PATENT DOCUMENTS 3,670,192 A   6/1972   Andersson et al.
5,319,276 A   6/1994   Schuler
(Continued)

FOREIGN PATENT DOCUMENTS

CN   1663094 A   8/2005
CN   2886901 Y   4/2007
(Continued)

OTHER PUBLICATIONS

CN Office Action dated Nov. 2, 2016, for CN patent application No. 201380070390.3.
(Continued)

*Primary Examiner* — Michael P Rodriguez
(74) *Attorney, Agent, or Firm* — Beusse Wolter Sanks & Maire

(57) ABSTRACT

A method and device for forming corona shielding on a winding bar for high-voltage machines has end corona shielding in a first section and outer corona shielding in a second section that adjoins the first section. The method includes providing a first composition, including a carrier material and a first filler therein and a first electrical resistance; providing a second composition, including the same carrier material and a second filler therein and a second electrical resistance, wherein the first and second fillers contain an identical dopable semiconductor material, doping of which determines electrical resistance of the first and second fillers, and wherein the second resistance differs from the first resistance; applying the first composition in the first
(Continued)

section to form the end corona shielding; and applying the second composition in the second section to form the outer corona shielding.

12 Claims, 2 Drawing Sheets

(51) Int. Cl.
*H02K 3/40* (2006.01)
*H02K 15/12* (2006.01)

(56) References Cited

U.S. PATENT DOCUMENTS

| | | | |
|---|---|---|---|
| 7,052,569 B2 | 5/2006 | Baumann et al. | |
| 7,244,470 B2 * | 7/2007 | Niles | H02G 7/00 |
| | | | 118/313 |
| 2003/0113441 A1 | 6/2003 | Baumann et al. | |
| 2003/0183166 A1 * | 10/2003 | Hasenour | B05B 13/0278 |
| | | | 118/313 |
| 2005/0194551 A1 | 9/2005 | Klaussner et al. | |
| 2007/0149073 A1 * | 6/2007 | Klaussner | H02K 3/40 |
| | | | 442/59 |
| 2014/0083592 A1 | 3/2014 | Groppel et al. | |

FOREIGN PATENT DOCUMENTS

| | | | |
|---|---|---|---|
| DE | 1463783 A1 * | 3/1969 | ............... H02K 3/40 |
| DE | 2050674 A1 | 5/1971 | |
| DE | 19963491 A1 | 7/2001 | |
| DE | 102009039456 A | 3/2011 | |
| EP | 1981150 A2 | 10/2008 | |
| EP | 2362399 A1 | 8/2011 | |
| EP | 2521247 A1 | 11/2012 | |
| GB | 992219 A | 5/1965 | |
| JP | 5683238 A | 7/1981 | |
| JP | S5683238 A | 7/1981 | |
| JP | S58157350 A | 9/1983 | |
| JP | S62144558 A | 6/1987 | |
| JP | H0670498 A | 3/1994 | |
| JP | H08237898 A | 9/1996 | |
| JP | 2003230855 A | 8/2003 | |
| JP | 2010028943 A | 2/2010 | |
| WO | 2012152580 A2 | 11/2012 | |

OTHER PUBLICATIONS

JP Office Action dated Jul. 25, 2016, for JP application No. 2015-553033.

JP Office Action dated Mar. 13, 2017, for JP patent application No. 2015-553033.

* cited by examiner ically used for generating electrical energy. EP 1 981 150 A2 describes a generator comprising a rotatable rotor and a stator arranged around the rotor. The rotor has a rotationally symmetrical laminate stack, in which electrically conductive winding bars extend. An end winding adjoins the laminate stack at both ends and connects the winding bars via connecting webs to form a closed winding.

METHOD AND APPARATUS FOR FORMING CORONA SHIELDING

CROSS REFERENCE TO RELATED APPLICATIONS

This application is the US National Stage of International Application No. PCT/EP2013/078111 filed Dec. 30, 2013, and claims the benefit thereof. The International Application claims the benefit of German Application No. DE 102013200499.0 filed Jan. 15, 2013. All of the applications are incorporated by reference herein in their entirety.

FIELD OF INVENTION

The present invention relates to a method for forming corona shielding on a winding bar for a high-voltage machine. In addition, the invention relates to an apparatus for forming corona shielding on the winding bar for the high-voltage machine.

BACKGROUND OF INVENTION

High-voltage machines in the form of generators are typically used for generating electrical energy. EP 1 981 150 A2 describes a generator comprising a rotatable rotor and a stator arranged around the rotor. The rotor has a rotationally symmetrical laminate stack, in which electrically conductive winding bars extend. An end winding adjoins the laminate stack at both ends and connects the winding bars via connecting webs to form a closed winding.

During operation of high-voltage machines at powers of over 500 MVA, rated voltages of over 10 kV can be reached. The components are subjected to correspondingly high mechanical, thermal and electrical loads. In particular, the winding bars extending in the laminate stack are therefore provided with an electrical insulation system, which is intended to prevent wear owing to electrical partial discharges.

EP 2 521 247 A1 describes an electrical insulation system for winding bars in high-voltage machines, in which each winding bar is enveloped by ground insulation. In addition, poorly conductive internal potential grading is provided between the ground insulation and the winding bars. The ground insulation is furthermore enveloped by corona shielding, which comprises outer corona shielding and end corona shielding.

Owing to the corona shielding and the internal potential grading, the ground insulation is shielded from cavities and detachments. Thus, the electrical potential in the ground insulation is decreased starting from the internal potential grading in the radial direction down to the outer corona shielding. In the region of the point at which the winding bars emerge from the laminate stack, the outer corona shielding ends, while the ground insulation is continued in the direction of the end winding. The electrical field also has a tangential component parallel to the interface with the ground insulation, in addition to the radial component, in this region. The greatest field strength in this case occurs at the end of the outer corona shielding.

It is therefore necessary to ensure potential grading at the end of the outer corona shielding and an increase in the dielectric strength in the vicinity of the exposed ground insulation. This is achieved by the end corona shielding. The aim of the potential grading in this case is to make the tangential potential buildup along the surface of the ground insulation more uniform. In the region of the end corona shielding, the potential is successively built up until it is at a high voltage in the region of the end winding. This potential profile is realized at both bar ends and is thus built up symmetrically.

In order to form the corona shielding, further layers in the form of paints are applied to the ground insulation. The paints for the end corona shielding and the outer corona shielding each contain different fillers, such as graphite and silicon carbide.

SUMMARY OF INVENTION

An object of the invention includes providing a method and an apparatus which simplify the formation of the corona shielding on a winding bar for a high-voltage machine and improve the corona shielding.

A method for forming corona shielding on a winding bar for high-voltage machines is proposed. In this case, the corona shielding comprises end corona shielding in a first section and outer corona shielding in a second section, which adjoins the first section. The method comprises the following steps:—providing a first composition, which comprises a carrier material and a first filler contained therein and having a first electrical resistance;—providing a second composition, which comprises the same carrier material and a second filler contained therein and having a second electrical resistance, wherein the first and second fillers contain an identical dopable semiconductor material, whose doping determines the electrical resistance of the first and second fillers, and wherein the second resistance differs from the first resistance;—applying the first composition in the first section so as to form the end corona shielding; and—applying the second composition in the second section so as to form the outer corona shielding.

In addition, an apparatus for producing corona shielding for a winding bar is proposed. In this case, the corona shielding has end corona shielding in a first section and outer corona shielding in a second section, which adjoins the first section. The apparatus comprises:—a first device for providing a first composition, which comprises a carrier material and a first filler contained therein having a first electrical resistance, and for providing a second composition, which comprises the same carrier material and a second filler contained therein having a second electrical resistance, wherein the first and second fillers contain an identical dopable semiconductor material, whose doping determines the electrical resistance of the first and second fillers, and wherein the second resistance differs from the first resistance; and—a second device for applying the first composition in the first section in order to form the end corona shielding, and for applying the second composition in the second section in order to form the outer corona shielding.

If the same carrier material, for example the same enamel, and fillers having the same properties, such as density, geometry and size, are used for both compositions, the corona shielding comprising end corona shielding and outer corona shielding can be formed in one go (a single manufacturing step). That is to say that a corresponding apparatus for applying the end and outer corona shielding does not need to be converted.

The formation of the corona shielding can thus be realized substantially more quickly, more easily and at lower cost than in the methods known from the prior art.

In addition, the corona shielding formed is electrically and thermally more stable since, in the case of the formation of the corona shielding in only one manufacturing step, a continuous transition between the end corona shielding and the outer corona shielding is provided. In particular, the end corona shielding has a continuous transition to the outer corona shielding and sudden transition points at which generally high field intensities occur are avoided.

A high-voltage machine is understood in the present context in particular to mean a generator, such as a turbo-generator, having an electrical power of more than 50 MVA, for example. Particular generators have powers of more than 500 MVA and rated voltages of more than 1 kV, more particularly of more than 10 kV. The method and the apparatus can be used, in addition to for winding bars, also in transformers or operational equipment having rated voltages of over 1 kV. Examples of such operational equipment are bushings or cables.

For high-voltage machines, the winding bar can have an electrical conductor or a composite structure comprising a plurality of electrical conductors, which can conduct currents of several 10 kA, for example. Suitable conductors are in particular copper conductors.

For electrical insulation purposes, the winding bar can be surrounded by ground insulation. The ground insulation comprises, for example, a matrix, such as epoxy resin, comprising mica particles as filler. For example, the mica particles have a platelet shape having an aspect ratio of 10 to 100, in particular 40 to 80. The aspect ratio in this case relates to the ratio in each case of length and width to thickness. Furthermore, the platelet-shaped mica particles can be oriented flat in the ground insulation and can be arranged so as to overlap one another in a plurality of layers. As a result, the electrical and mechanical strength of the ground insulation is increased.

The winding bar in a high-voltage machine is advantageously passed through a laminate stack and has protruding ends on both sides, which are deflected so as to form a conductor loop on an end winding. In this arrangement, the outer corona shielding can extend within the laminate stack and over a partial length outside the laminate stack. The end corona shielding particularly adjoins the outer corona shielding directly, and extends over a partial length of the winding bar, which partial length is arranged between the laminate stack and the end winding. The corona shielding on the winding bar is thus advantageously symmetrical, wherein end corona shielding adjoins each of the two sides of the outer corona shielding.

In one embodiment, the second composition is set during application in such a way that the electrical resistance of the second composition is substantially constant along the second section. In this case, substantially means that the electrical resistance fluctuates by less than 100 Ω, particularly by less than 10Ω.

In a further embodiment, the electrical resistance of the first composition is set by virtue of a proportion by weight of the first filler being replaced by a proportion by weight of the second filler. The electrical resistance of the first composition is therefore determined by the proportion by weight of the first and second fillers in said composition. In this case, the proportion by weight is based on the total weight of the first and second fillers in the first composition.

In a further embodiment, the first composition can be set during application such that the electrical resistance of the first composition is substantially constant along the first section. Alternatively, the first composition can be set during application in such a way that the electrical resistance of the first composition decreases along the first section in the direction of the second section. Thus, in the first section, end corona shielding is realized which has a resistance which is dependent on the location and at the same time independent of the field intensity along the first section. Corresponding to the electrical resistance, the potential increases from the end of the outer corona shielding along the end corona shielding in the first section. Thus, the potential profile is made more uniform and a sudden change in potential at the end of the outer corona shielding is avoided.

In a further embodiment, during application the proportion by weight of the first filler and the second filler can be varied continuously along the first section in such a way that the resistance of the first composition varies continuously along the first section and makes a continuous transition to the resistance of the second composition in the second section. Thus, end corona shielding with a continuously varying resistance can be realized, as a result of which the potential at the end of the outer corona shielding increases constantly, i.e. without any sudden changes or steps. Owing to the continuous transition between the outer corona shielding and the end corona shielding, furthermore a sudden change in the resistance profile and in the corresponding potential profile is avoided.

In this case, in addition to the first and second fillers, further fillers can be included in the first composition, which further fillers have a resistance which is different than the first and second resistances. In particular, at least one third filler having a third resistance can be included, wherein the third filler likewise comprises the same dopable semiconductor material and the third resistance differs from the first and second resistances. In an advantageous embodiment, the third resistance is between the first and second resistances. The more fillers with different resistances are contained in the first composition, the more accurately the potential grading can be set by the end corona shielding. In particular, a linear potential profile can be implemented.

In a further embodiment, the first composition can have a greater electrical resistance than the second composition. As a result, outer corona shielding can be formed which has typical square resistance values (measured for a field intensity of 100 V/mm) in the range of from $1*10e3$ to $1*10e6$ Ω, particularly in the range of from $1*10e4$ to $1*10e5$ Ω. The end corona shielding can, on the other hand, have a varying square resistance value (measured for a field intensity of 100 V/mm) in the range of from $1*10e3$ to $1*10e15$ Ω, particularly in the range of from $1*10e4$ to $5*10e13$ Ω. Thus, the potential grading at the end of the outer corona shielding can be made more uniform by the adjoining end corona shielding.

In order to adapt the resistance of the compositions easily, the first, second and third fillers comprise planar mica particles coated with the same dopable semiconductor material, wherein the doping of the semiconductor material determines the electrical resistance of the first, second and third fillers. By virtue of the doping of the semiconductor material, fillers with different electrical resistances can be provided, which nevertheless have the same properties during processing. The electrical resistance of the compositions can correspondingly be set easily by virtue of the fillers contained therein and can be matched to the requirements of the respective section without there being a need for different materials for the fillers.

For example, the filler can comprise tin oxide ($SnO_2$) doped with antimony (Sb). In this case, the mica particles can have a platelet shape with an aspect ratio of from 10 to 100, particularly of from 20 to 50. By virtue of the use of the dopable semiconductor material, different electrical square resistances in the range of from $1*10e3$ to $5*10e13$ Ω can be realized, depending on the doping. In order to provide a filler with a high square resistance in the range of from $1*10e10$ to $1*10e15\ \Omega$, particularly $1*10e12$ to $1*10e13\ \Omega$, the mica particles can additionally be coated with an electrically insulating layer, such as titanium dioxide ($TiO_2$).

In particular, the doping of the dopable semiconductor material is selected such that the electrical square resistance of the fillers used is varied in increments of $1*10e2$ to $1*10e5$, particularly in increments of approximately $1*10e4$. Thus, depending on the axial position along the winding bar, different first and second compositions can be provided, whose electrical resistance is adapted in each case over a wide range by the fillers contained in the first and second compositions.

In one embodiment, the carrier material of the first and/or second compositions has a filler content of more than 45 wt. %, in particular more than 50 wt. %. Figures in wt. % are in this case based on the total weight of the composition. Given such a weight content of filler, the fillers in the carrier material can touch one another and form corresponding conduction paths. As a result, the electrical conductivity is increased up until saturation. At saturation, the electrical conductivity or the electrical resistance of the composition is substantially dependent on the electrical resistance of the fillers contained. In order to control the electrical resistance of the composition, the weight content of filler is particularly at saturation. In the case of coated mica particles as filler, this corresponds to at least 45 wt. % based on the first or second composition.

In an advantageous embodiment, the corona shielding comprising end corona shielding and outer corona shielding is formed in a continuous method. That is to say that the end corona shielding and the outer corona shielding are produced in a single manufacturing step.

The carrier material can contain a solvent-containing or solvent-free plastic. Advantageous carrier materials are solvent-containing plastics in the form of paints. Suitable plastics are, for example, thermosetting plastics or thermoplastics since they can be processed at room temperature, are thermally resistant up to 200 degrees Celsius, in particular up to 140 degrees Celsius and can be cured by ultraviolet (UV) or infrared (IR) light on addition of corresponding curing agents at room temperature. For example, plastics based on polysilazane, based on polyesterimide or based on epoxide are suitable for the carrier material. The solvent can furthermore contain aromatic hydrocarbons, such as benzene or toluene esters, ethylmethylketone or ethyl acetate.

Depending on the carrier material, the first and second compositions can be applied using different methods. Compositions with solvent-containing carrier materials are suitable for spraying, for example. Compositions comprising solvent-free carrier materials can be applied as a powder coating on the winding bar.

Advantageously, the first and second compositions are applied by spraying. In order to apply the first and second compositions, one or more spray nozzles can be used.

In one embodiment, the first and second compositions can be provided in mixed form by a mixer and applied using a single spray nozzle.

In a further embodiment, the first composition can be applied using at least one first spray nozzle and the second composition can be applied using at least one second spray nozzle. In this case, each spray nozzle can apply filler with an electrical resistance to the winding bar, wherein the intensity of each spray nozzle sets the first and second composition in relation to the fillers contained and thus the respective resistance.

In one embodiment, the first device has a plurality of storage containers comprising fillers, which have a different electrical resistance for each storage container. Thus, the first, second and possibly third fillers can each be stored in a storage container. Furthermore, the carrier material can be provided in a separate storage container or together with the fillers in the storage containers.

The second device can have one or more spray nozzles. In this case, the spray nozzles are mounted movably in the axial direction along the winding bar.

In the case of a second device comprising a plurality of spray nozzles, the first device can comprise a plurality of storage containers for the respective fillers, which are each assigned to a spray nozzle.

Furthermore, in the case of a plurality of spray nozzles, the spray nozzles can each be connected to a control device, by means of which the first composition is variable in respect of its electrical resistance along the first section and the second composition can be set with a substantially constant electrical resistance along the second section. Thus, the compositions and the resistance thereof are controlled by the quantity of filler applied in each case in order to realize a first and a second composition, which are dependent on the location, in the axial direction along the winding bar. In this case, the intensity of the respective spray nozzle is controlled depending on the axial position of the spray nozzle and the corresponding composition.

If only a single spray nozzle is used, a mixer is arranged between the storage containers and the spray nozzle. Thus, the fillers with different electrical resistances can be supplied to the mixer in the desired weight contents and mixed to form a first and a second composition. In order to control the weight contents of the fillers with different resistances in the first and second compositions, the mixer can furthermore be connected to a control device. Thus, the first composition can be varied in terms of its electrical resistance along the first section and the second composition can be set with a substantially constant electrical resistance along the second section by means of the control device. Thus, the composition and the resistance thereof is controlled by the weight contents of the fillers applied to the mixer in order to realize a first and a second composition, which are dependent on the location, in the axial direction along the winding bar. Correspondingly, the corresponding composition is supplied to the mixer, depending on the axial position of the spray nozzle.

The features and embodiments described in relation to the method apply to the apparatus correspondingly. Similarly, the features and embodiments described in relation to the apparatus apply correspondingly to the method.

BRIEF DESCRIPTION OF THE DRAWINGS

The invention will be explained in more detail below with reference to the attached schematic drawing, in which.

DETAILED DESCRIPTION OF INVENTION

Figure 1:
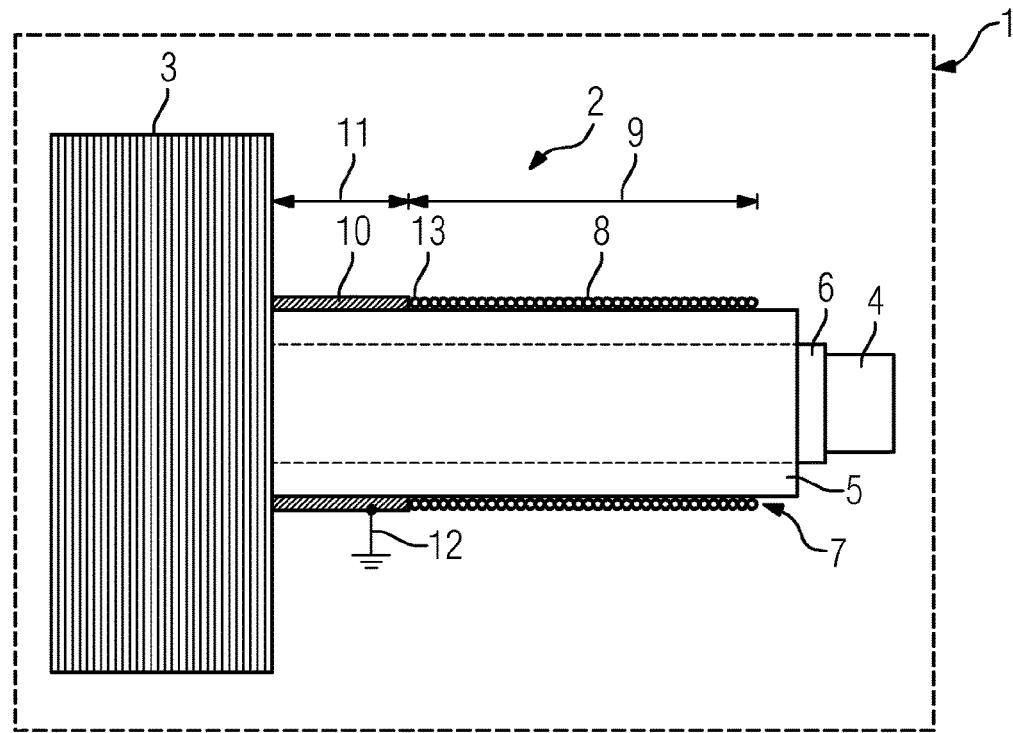
FIG. 1 shows a detail of a longitudinal section of a generator stator comprising a laminate stack and a winding bar.

FIG. 1 shows a detail of a generator 1, which comprises a generator stator 2 comprising a laminate stack 3 and a winding bar 4.

The winding bar 4 is passed through the laminate stack 3. The end of the winding bar 4 protrudes out of the laminate stack 3 and is deflected at the end winding (not illustrated) so as to form conductor loops. The arrangement shown in FIG. 1 is typically constructed symmetrically with end winding bars 4 on both sides of the laminate stack 3.

For insulation purposes, the winding bar 4 is enveloped by ground insulation 5. In order to avoid interfacial partial discharges between the components of the generator stator 2, the ground insulation 4 is furthermore surrounded by layers 6, 7. Thus, a layer 6 is arranged as internal potential grading between the winding bar 4 and the ground insulation 5.

A further layer, which is in the form of corona shielding 7, is located between the laminate stack 3 and the winding bar 4. Said further layer comprises end corona shielding 8 in a first section 9 and outer corona shielding 10 in a second section 11, wherein the outer corona shielding is connected to ground 12. The first section 9 in this case runs between the laminate stack 3 and the end winding (not illustrated) and directly adjoins the second section 11, which runs within the laminate stack 3 and extends beyond the laminate stack 3 by a short section.

Correspondingly, the outer corona shielding 10 envelopes the ground insulation 5 within the laminate stack 3 and is passed further over a short section once the winding bar 3 emerges from the laminate stack 3. The end corona shielding 8 directly adjoins the outer corona shielding 10 and extends over a partial length between the laminate stack 3 and the end winding (not illustrated). The electrical field intensity within the ground insulation 5 is decreased starting from the internal potential grading 6 to the corona shielding 7 by the layers 6, 7. The end corona shielding 8 is provided at the ends of the winding bar 4, which protrudes out of the laminate stack 3 on both sides, said end corona shielding decreasing the electrical potential starting from the outer corona shielding 10.

In accordance with a method known internally to the applicant, the corona shielding 7 is applied in a plurality of manufacturing steps. In particular, the outer corona shielding 10 and the end corona shielding 8 are applied successively. This increases manufacturing complexity and manufacturing costs. In addition, owing to the successive manufacture in a plurality of steps, subsections with interfaces, such as, for example, the transition 13 between the outer corona shielding 10 and the end corona shielding 8, which generally form weak points in the corona shielding 7, occur. High field strengths form at such transition points 13, which results in thermal and electrical loading. In this case, the loading can be so great that the corona shielding 7 and, in the worst case scenario, the ground insulation 5 is damaged.

Figure 2:
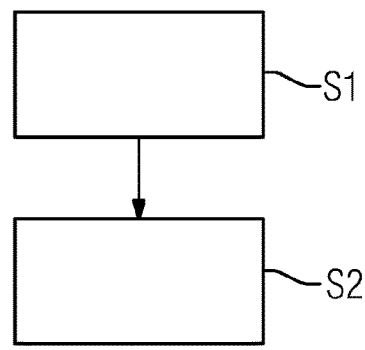
FIG. 2 shows a sequence for a method for forming corona shielding in the form of a flow chart.

FIG. 2 shows a sequence for the method for forming corona shielding 7 in the form of a flow chart.

In a first step S1, a first and a second composition are provided so as to form the corona shielding 7 for a winding bar 4. The first composition contains a first carrier material and a first filler contained therein having a first electrical resistance and a second filler having a second electrical resistance, wherein the second electrical resistance differs from the first electrical resistance. The second composition contains a second carrier material and a third filler contained therein having a third electrical resistance. In this case, the first and second carrier materials and/or the second and third fillers have the same chemical composition.

The first, second and third fillers each comprise mica particles which are coated with a dopable semiconductor material and which have a different electrical resistance depending on the doping. Thus, the first and second fillers of the first composition have, for example, a first electrical square resistance of $1*10e12$ Ω and a second electrical square resistance $1*10e8$ Ω. In addition, a fourth filler can be used in the first composition, which fourth filler has, in the same way as the third filler of the second composition, an electrical square resistance of $1*10e4$ Ω. Furthermore, the first and second compositions contain, as carrier material, a paint based on a plastic, such as polysilazane, polyesterimide or epoxide.

In a second step S2, the first and second compositions are applied in such a way that the end corona shielding 8 is formed in the first section 9 and the outer corona shielding 10 is formed in the second section 11. In this case, the end corona shielding 8 directly adjoins the outer corona shielding 10. Correspondingly, the first composition is applied in the first section 9 so as to form the end corona shielding 8, and the second composition is applied in the second section 11 so as to form the outer corona shielding 10.

During application of the first composition, a weight content of the first and second fillers can be varied along the first section 9. As a result, the electrical resistance of the first composition is varied depending on the location of the first section 9 in such a way that the electrical resistance decreases along the first section 9 in the direction of the second section 11. The end corona shielding 8 therefore has a continuously varying resistance, as a result of which the potential is decreased, starting from the end of the outer corona shielding 10, continuously in the end corona shielding and increases continuously or linearly.

Owing to the method, a winding bar 4 with corona shielding 7, as illustrated in FIG. 1, is formed. Correspondingly, the corona shielding 7 has outer corona shielding 10 and end corona shielding 8.

Figure 3:
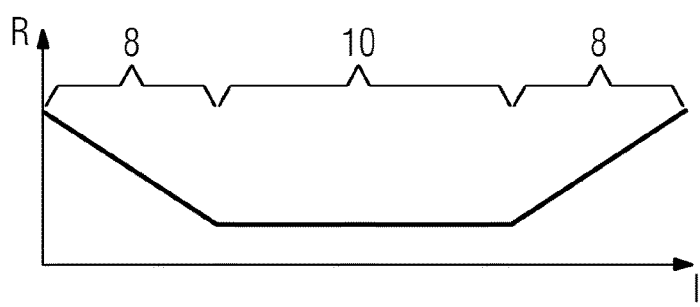
FIG. 3 shows a profile of the electrical resistance along the winding bar in FIG. 1.

A profile of the electrical resistance along the winding bar 4 is shown in FIG. 3.

In this case, the electrical resistance R is plotted against the axial position 1 along the winding bar 4. The electrical resistance R is constant in the region of the outer corona shielding 10. At the transition between the outer corona shielding 10 and the end corona shielding 8, the electrical resistance R increases continuously in the region of the end corona shielding 8. Correspondingly, the potential in the region of the end corona shielding 8 is increased to a high voltage from the ground potential of the outer corona shielding 10 up to the end winding (not illustrated). Thus, potential grading is realized by the end corona shielding 8, which potential grading increases the potential at the surface of the winding bar 4 continuously.

Figure 4:
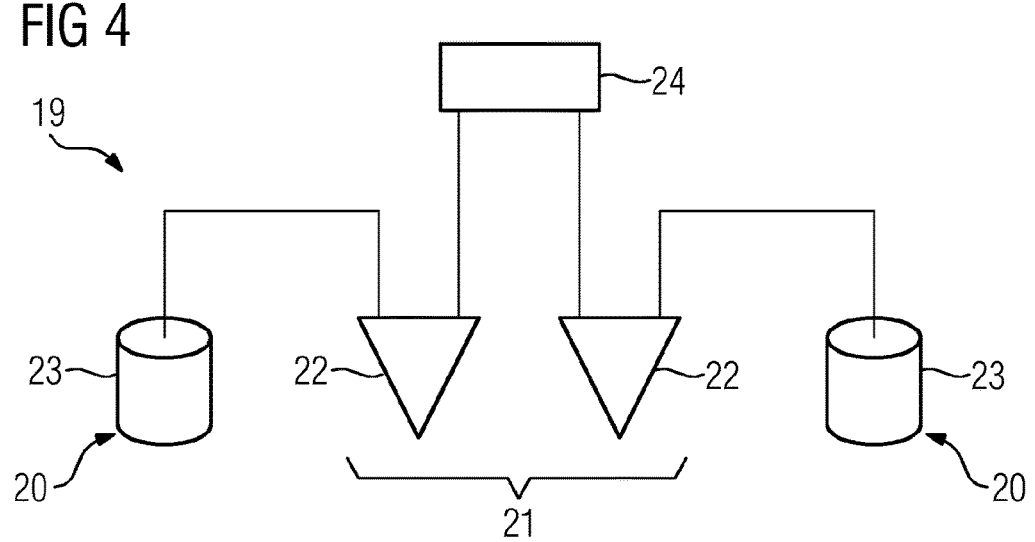
FIG. 4 shows an exemplary apparatus for implementing the method shown in FIG. 2.

FIG. 4 shows an exemplary apparatus 19 for forming the corona shielding 7 shown in FIG. 1.

The apparatus 19 comprises a first device 20 for providing the compositions and a second device 21 for applying the composition. The second device 21 comprises, in the embodiment illustrated, two spray nozzles 22, which are each connected to a storage container 23 of the first device 20. In other embodiments, more than two spray nozzles 22 and storage containers 23 can also be provided.

The storage containers 23 each contain the enamel with filler dispersed therein, which is supplied to the respective spray nozzles 22. Thus, the first storage container 23 contains the first filler, which is supplied to the first spray nozzle. The second storage container 23 contains the second filler, which in this embodiment is also at the same time used as third filler and is supplied to the second spray nozzle. The paints in the first and second storage containers 23 can likewise have the same chemical composition.

Furthermore, a control device 24 is assigned to the spray nozzles 22, by means of which control device the intensity of the spray nozzles 22 is controllable depending on the location, as a result of which, in turn, the content of the first and second fillers in the first composition and therefore the electrical resistance thereof can be set. The spray nozzles 22 can be operated, for example, along the first section 9 with opposite intensity. Thus, the first spray nozzle initially has an intensity of 100%, while the second spray nozzle 22 initially has an intensity of 0%. At the end of the first section 9 and at the beginning of the second section 11, there is then a reverse ratio (first spray nozzle 0%, second spray nozzle 100%). The second composition along the second section 11 can then be applied easily by virtue of continued spaying exclusively with the second spray nozzle 22.

Figure 5:
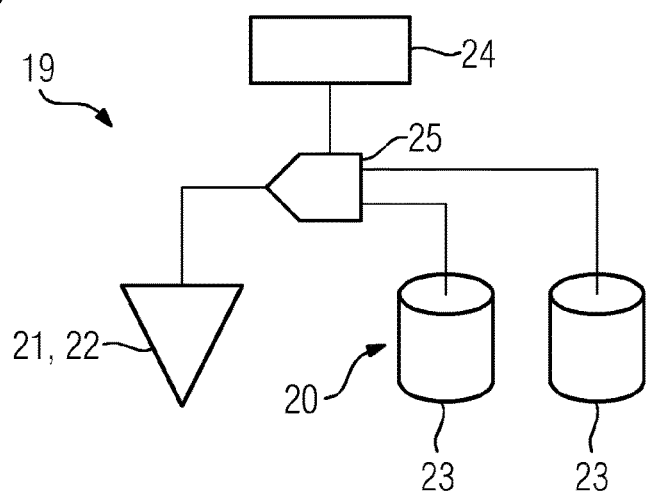
FIG. 5 shows a further exemplary apparatus for implementing the method shown in FIG. 2.

FIG. 5 shows, schematically, a further exemplary apparatus 19 for producing the corona shielding 7.

In contrast to FIG. 4, the second device 20 in FIG. 5 comprises a single spray nozzle 22. The spray nozzle 22 is connected to a mixer 25, which mixes the stored filler and the enamel to form the first or second composition. For this purpose, the filler and the enamel are supplied to the mixer 25 from the storage containers 23. The storage containers 23 each contain the enamel with the filler dispersed therein. Thus, the first storage container 23 contains the first filler, which is supplied to the first nozzle. The second storage container 23 contains the second filler, which in this embodiment is also used at the same time as the third filler and is supplied to the second spray nozzle. The paints in the first and second storage containers 23 can likewise have the same chemical composition. The mixer 25 is furthermore connected to a control device 24, by means of which the filler contents in the first and second compositions are controllable in order to supply the first and second compositions to the spray nozzle 22 depending on the location.

Although the invention has been described here with reference to various exemplary embodiments, it is not restricted to these embodiments, but can be modified in a variety of ways.

The invention claimed is:

1. A method for forming corona shielding on a winding bar for high-voltage machines comprising end corona shielding in a first section and outer corona shielding in a second section, which adjoins the first section, said method comprising:
   providing a first composition, which comprises a carrier material and a first filler contained therein and having a first electrical resistance;
   providing a second composition, which comprises the same carrier material and a second filler contained therein and having a second electrical resistance, wherein the first and second fillers contain an identical dopable semiconductor material, whose doping determines the electrical resistance of the first and second fillers, and wherein the second resistance differs from the first resistance;
   applying the first composition in the first section to form the end corona shielding; and
   applying the second composition in the second section to form the outer corona shielding;
   wherein during application, a proportion by weight of the first filler and a proportion by weight of the second filler are varied continuously along the first section such that the electrical resistance of the first composition varies continuously along the first section and makes a continuous transition into the electrical resistance of the second composition in the second section.

2. The method as claimed in claim 1,
   wherein the second composition is set during application such that the electrical resistance of the second composition is substantially constant along the second section.

3. The method as claimed in claim 1,
   wherein the electrical resistance of the first composition is set by virtue of a proportion by weight of the first filler being replaced by a proportion by weight of the second filler.

4. The method as claimed in claim 1,
   wherein the first composition contains at least one third filler having a third resistance, wherein the third filler likewise comprises the same dopable semiconductor material, and the third resistance differs from the first and second resistances.

5. The method as claimed in claim 1,
   wherein the carrier material of the first and second compositions has a filler content of more than 45 wt. %.

6. The method as claimed in claim 1,
   wherein the corona shielding is formed in a continuous method.

7. The method as claimed in claim 1,
   wherein the first and second compositions are applied by a spraying process that is a single continuous manufacturing step along both the first and second sections such that a sudden change in resistance in an axial direction along the winding bar is avoided.

8. The method as claimed in claim 1,
   wherein the first and second compositions are provided in mixed form by a mixer and applied using a single spray nozzle or wherein the first composition is applied with at least one first spray nozzle and the second composition is applied with at least one second spray nozzle.

9. A method for forming corona shielding on a winding bar for high-voltage machines comprising end corona shielding in a first section and outer corona shielding in a second section which adjoins the first section, said method comprising:
   providing a first composition which comprises a carrier material and a first filler contained therein and having a first electrical resistance;
   providing a second composition which comprises the same carrier material and a second filler contained therein and having a second electrical resistance, wherein the first and second fillers contain an identical dopable semiconductor material whose doping determines the electrical resistance of the first and second fillers, and wherein the second resistance differs from the first resistance;
   wherein the first composition and the second composition are applied along the first and section sections in a single continuous manufacturing step by respective nozzles controlled to apply a varying amount of the respective fillers along a length of the winding bar such that a resistance of the corona shielding along the first section makes a continuous transition into a resistance of the corona shielding along the second section.

10. The method of claim 9, wherein the first composition and the second composition are applied by the respective nozzles controlled to apply varying and opposite amounts of the respective fillers along a length of the first section, and wherein the second composition is applied without the first composition along the second section such that a sudden transition point between the first and second sections is avoided.

11. A method for forming corona shielding on a winding bar for a high-voltage machine comprising end corona shielding in a first section and outer corona shielding in a second section which adjoins the first section, said method comprising:
- applying a corona shielding material along both the first and section sections in a single continuous manufacturing step, wherein the corona shielding material comprises a carrier material and a dopable filler material whose doping determines an electrical resistance of the corona shielding material; and
- varying an amount of dopant in the applied corona shielding material along an axial length of the winding bar such that an electrical resistance of the corona shielding avoids a sudden transition between the end corona shielding and the outer corona shielding.

12. The method of claim 11, wherein the corona shielding material comprises a first composition and a second composition applied by respective nozzles controlled to apply varying and opposite amounts of the dopable filler material along a length of the first section, and to apply the second composition without the first composition along the second section.

* * * * *